United States Patent
Fukui (10) Patent No.: US 6,442,200 B1
(45) Date of Patent: Aug. 27, 2002

(54) MODULATING CIRCUIT, DEMODULATING CIRCUIT AND MODULATING AND DEMODULATING CIRCUIT SYSTEM, USING PPM METHOD

(75) Inventor: Ryoh Fukui, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/108,548

(22) Filed: Jul. 1, 1998

(30) Foreign Application Priority Data

Jul. 3, 1997 (JP) .............................. 9-178095

(51) Int. Cl.[7] .............................. H03R 7/04
(52) U.S. Cl. ...................... 375/239; 329/313
(58) Field of Search .................. 375/239; 329/313; 332/112; 370/213; 341/183, 187; 359/154, 181, 184, 185

(56) References Cited

U.S. PATENT DOCUMENTS

| | | | | |
|---|---|---|---|---|
| 4,736,237 A | * | 4/1988 | Fling et al. ................. | 348/508 |
| 4,786,985 A | * | 11/1988 | Williams ..................... | 386/68 |
| 4,841,544 A | * | 6/1989 | Nuytkens .................... | 375/150 |
| 4,857,928 A | * | 8/1989 | Gailus et al. ............... | 341/143 |
| 4,922,537 A | * | 5/1990 | Frederiksen ................ | 704/212 |
| 5,001,728 A | * | 3/1991 | Fuldner ....................... | 375/328 |
| 5,025,454 A | * | 6/1991 | Hogrefe ...................... | 375/239 |
| 5,140,702 A | * | 8/1992 | Laflin ........................ | 455/166.1 |
| 5,350,411 A | * | 9/1994 | Ryan et al. .................. | 607/32 |
| 5,450,450 A | * | 9/1995 | Lee ............................ | 375/354 |
| 5,691,665 A | * | 11/1997 | Ohtani ....................... | 375/239 |
| 5,977,822 A | * | 11/1999 | Rybicki et al. ............. | 375/268 |
| 6,064,697 A | * | 5/2000 | Yoshikawa ................. | 375/242 |

\* cited by examiner

Primary Examiner—Chi Pham
Assistant Examiner—Kevin M. Burd
(74) Attorney, Agent, or Firm—Cooper & Dunham LLP (57) ABSTRACT

A demodulating circuit demodulates a PPM signal obtained as a result of modulation performed in accordance with a PPM method. This circuit includes a detecting portion and a control portion. The detecting portion detects a predetermined carrier pulse provided within a symbol period of the PPM signal, using a clock signal having a frequency double or higher than double the transmission rate of the PPM signal. The controlling portion stops supply of the clock signal to the detecting circuit after the detecting portion detects the predetermined carrier pulse until the subsequent symbol period starts.

10 Claims, 9 Drawing Sheets

MODULATING CIRCUIT, DEMODULATING CIRCUIT AND MODULATING AND DEMODULATING CIRCUIT SYSTEM, USING PPM METHOD

BACKGROUND OF THE INVENTION

1. Field of the Invention

The present invention relates to a modulating circuit, a demodulating circuit and a modulating and demodulating circuit system, using a PPM method.

2. Descriptions of the Related Art

Conventionally, a modulation method, called PPM (Pulse Position Modulation) method has, been known. In this modulation method, a series of data is divided wherein a predetermined number of bits are used as a unit. Then, each division of data is converted into a PPM signal in accordance with a predetermined conversion rule. The PPM signal represents each division of data as a position of a carrier pulse provided in a unit period called 'symbol period'. The carrier pulse is provided in the symbol period at any one of N chips which are obtained as a result of dividing the symbol period by N. The modulation method in which the symbol period is divided by N is called 'N-value PPM method'. For example, in the method of the IrDA 1.1 ("Infrared Data Association Serial Infrared (SIR) Physical Layer Link Specification", version 1.1, 1995), 4 Mbps, a 4-value PPM method is used.

(The IrDA (Infrared Data Association) is the association whose purpose is to create infrared serial data interconnection standards. More than 120 companies throughout the world participate in the IrDA. Many IrDA members are now developing and manufacturing their IrDA compliant product.)

Figure 1:
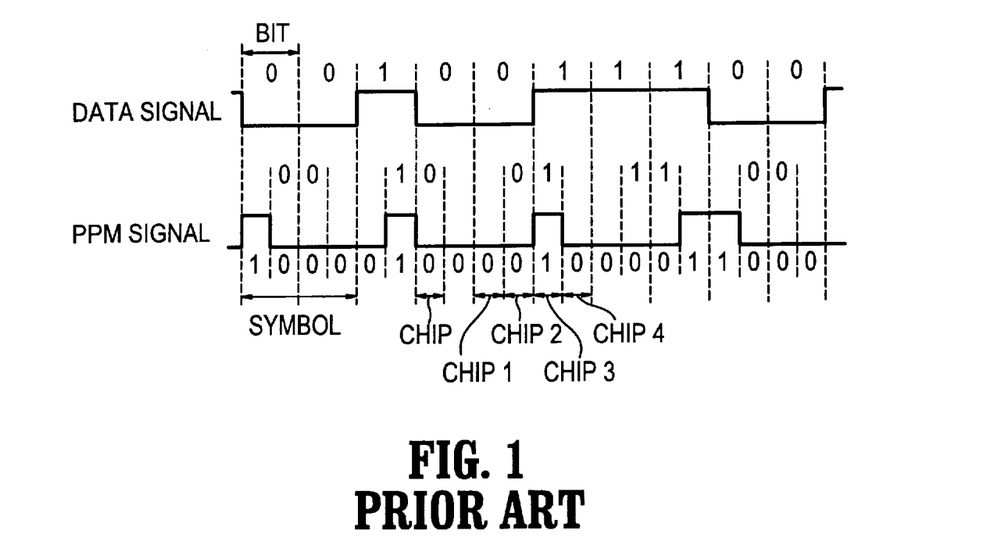
FIG. 1 shows a PPM signal obtained from modulating a data signal in accordance with a 4-value PPM method.

FIG. 1 shows the PPM signal which is obtained as a result of a data signal undergoing the modulation in the 4-value PPM method. In the 4-value PPM method, a data signal is divided so that 2 bits are one unit. Then, each 2 bits of the data signal are converted into the PPM signal as a result of a pulse being provided at a chip specified in accordance with the value of the 2 bits of the data signal. For purpose of convenience, the 4 chips in one symbol period are represented as chip 1, chip 2, chip 3 and chip 4 in chronological order. In accordance with a predetermined conversion rule, the 2 bits of data signal "00" are converted into the PPM signal "1000" wherein the pulse is provided at the chip 1. The 2 bits of data signal "10" are converted into the PPM signal "0100" wherein the pulse is provided at the chip 2. The 2 bits of data signal "01" are converted into the PPM signal "0010" wherein the pulse is provided at the chip 3. The 2 bits of data signal "11" are converted into the PPM signal "0001" wherein the pulse is provided at the chip 4.

Demodulation of the thus-obtained PPM signal is performed by using a clock signal having a frequency several times the transmission rate of the PPM signal. In the demodulation, the position of the carrier pulse, that is, the timing of the chip at which the pulse is provided, is detected. Then, by using the detected timing of the chip, the original data is obtained based on the conversion rule which was used in the modulation.

Figure 2:
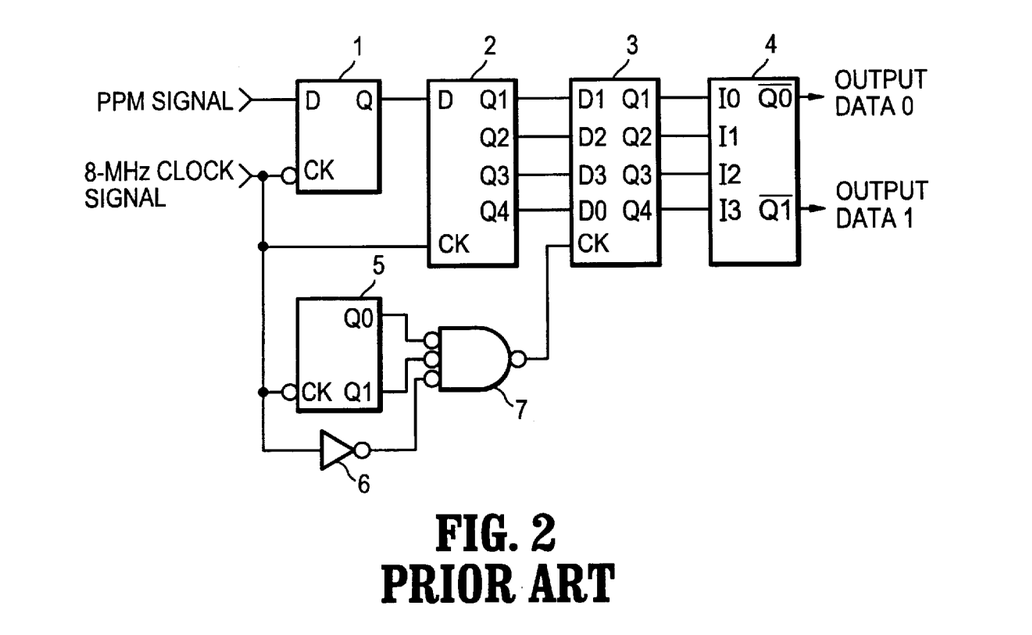
FIG. 2 shows a circuit, in the related art, for demodulating, the PPM signal which has been obtained from the modulation in accordance with the 4-value PPM method.

FIG. 2 shows a demodulating circuit of the transmission rate of 4 Mbps in the related art. This demodulating circuit demodulates the PPM signal obtained through the 4-value PPM method so as to obtain the original data signal. This circuit includes a flip-flop 1, a shift register 2, a register 3, a decoder 4, a counter 5, an inverter 6 and an OR gate 7.

Figure 3:
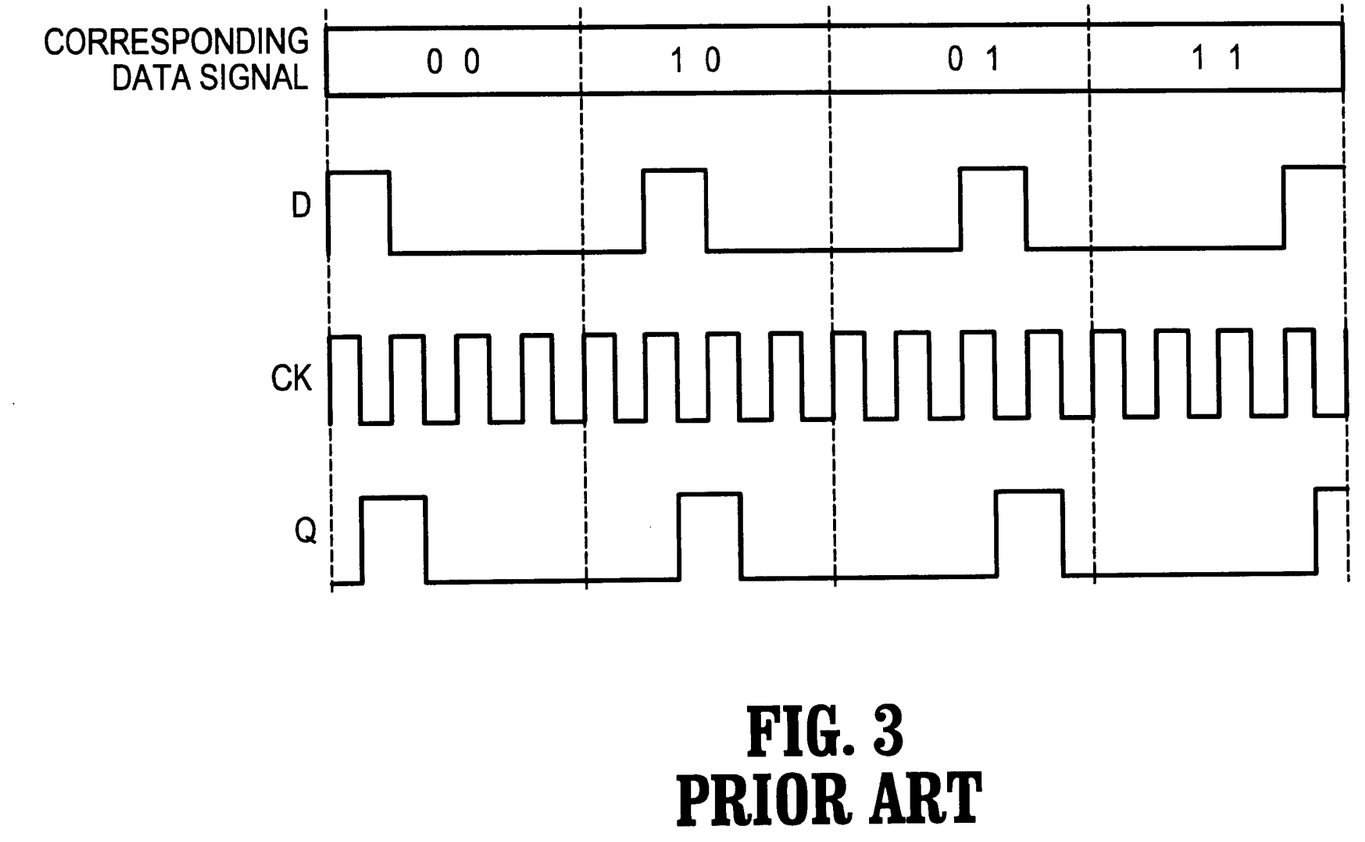
FIG. 3 is a time chart showing the states of respective signals in the demodulating circuit shown in FIG. 2.

A clock signal having the frequency of 8 MHz which is perfectly in synchronization with the PPM signal is input to the flip-flop 1. In this circuit, the level of the PPM signal is determined at each decaying edge of the clock signal of 8 MHz. Thus, data for each 4 bits is obtained, and the original data is obtained therefrom through the decoder 4. The data input to the flip-flop 1 is output to the subsequent shift register 2 in synchronization with the timing of each decaying edge of the clock signal (See a time chart shown in FIG. 3).

The shift register 2 performs digital-to-parallel conversion on the thus-provided data, and outputs a 4-bit parallel signal from respective output terminals Q1, Q2, Q3 and Q4 in response to inputting of the clock signal. This 4-bit parallel signal (Q1, Q2, Q3 and Q4) is input to data inputting terminals D0, D1, D2 and D3 of the register 3 in synchronization with the clock signal, respectively.

The counter 15 is a 2-bit counter, and the count value thereof is incremented in synchronization with each decaying edge of the clock signal. The signals output from output terminals Q0 and Q1 of the counter 5 are input to two inputting terminals of the 3-input OR gate 7, respectively. The clock signal is inverted by the inverter 6 and the thus-obtained clock signal is input to the remaining input terminal of the 3-input OR gate 7. In response to these signals input to the 3-input OR gate 7, the OR gate 7 outputs a clock pulse of "L" to the register 3 in synchronization with the rising edge of the first cycle of the clock signal.

The shift register 3 outputs the 4-bit parallel signal (Q1, Q2, Q3 and Q4), which has been output from the shift register 2, to the decoder 4 at the timing at which a clock pulse of "H", output from the OR gate 7, is input to the shift register 3.

The decoder 4 demodulates the 4-bit parallel signal which has been input to input terminals I0, I1, I2 and I3 thereof based on the predetermined conversion rule so as to obtain and output the 2-bit data signal which is the signal before having been modulated. Through the decoder 4, the PPM signal "1000" is converted into the 2-bit data signal "00", the PPM signal "0100" is converted into the 2-bit data signal "10", the PPM signal "0010" is converted into the 2-bit data signal "01", and the PPM signal "0001" is converted into the 2-bit data signal "11".

For example, in the method of the IrDA1.1, 4 Mbps, the span of one chip (pulse) is 125 ns. In this case, in order to determine the position of the carrier pulse, a clock signal having a frequency of equal to or more than 8 MHz is required. During the demodulation, this clock signal is input to the flip-flop 1, shift register 2, counter 5 and so forth at any time. As a result, a large amount of electric current is consumed by the demodulating circuit.

SUMMARY OF THE INVENTION

An object of the present invention is to provide a modulating circuit, a demodulating circuit and a modulating and demodulating circuit system, using the PPM method, by which a reduced amount of electric current is consumed.

A first demodulating circuit, according to the present invention is provided for demodulating a PPM signal obtained as a result of modulation performed in accordance with a PPM method. The circuit comprises:

a detecting circuit detecting a predetermined carrier pulse provided within a symbol period of the PPM signal, using a clock signal having a frequency doubler or higher than double the transmission rate of the PPM signal.

Controlling means is provided for stopping supply of the clock signal to thee detecting circuit after the detecting circuit detects the predetermined carrier pulse until the subsequent symbol period starts.

A first modulating circuit, according to the present invention, is provided for modulating an input data signal into a PPM signal in accordance with a PPM method. The circuit comprises counting means for dividing a predetermined amount of the input data signal into divisions, each division having a predetermined number of bits, and counting an appearance frequency of the divisions of the input data signal for each identical data.

Setting means is provided for setting, in accordance with the appearance frequency of the divisions of the input data signal counted for each identical data by the counting means, a conversion rule in accordance with which the divisions of the input data signal are converted into the PPM signal for each identical data.

Modulating means is provided for modulating the predetermined amount of the input data signal into the PPM signal in accordance with the conversion rule set by the setting means; and Outputting means is provided for outputting data of the conversion rule and the PPM signal.

It is preferable that the setting means sets such a conversion rule that each of the divisions of the input data signal which have the common identical data appearing more frequently is converted into the PPM signal in which the carrier pulse is provided earlier within the symbol period.

A second demodulating circuit, according to the present invention, comprises a detecting circuit detecting a predetermined carrier pulse provided within a symbol period of a PPM signal, using a clock signal having a frequency double or higher than double the transmission rate of the PPM signal.

Controlling means is provided for stopping supply of the clock signal to the detecting circuit after the detecting circuit detects the predetermined carrier pulse until the subsequent symbol period starts.

Demodulating means is provided for demodulating the PPM signal based on data of a conversion rule which is sent to the demodulating circuit together with the PPM signal.

A modulating and demodulating circuit system, according to the present invention, comprises a modulating circuit for modulating an input data signal into a PPM signal in accordance with a PPM method. The system comprises Counting means is provided for dividing a predetermined amount of the input data signal into divisions, each division having a predetermined number of bits, and counting an appearance frequency of the divisions of the input data signal for each identical data;

Setting means is provided for setting, in accordance with the appearance frequency of the divisions of the input data signal counted for each identical data by the counting means, a conversion rule in accordance with which the divisions of the input data signal are converted into the PPM signal for each identical data.

Modulating means is provided for modulating the predetermined amount of the input data signal into the PPM signal in accordance with the conversion rule set by the setting means.

Outputting means is provided for outputting data of the conversion rule and the PPM signal.

A demodulating circuit comprising:

a detecting circuit detecting a predetermined carrier pulse provided within a symbol period of a PPM signal, using a clock signal having a frequency double or higher than double the transmission rate, of the PPM signal.

Controlling mean is provided for stopping supply of the clock signal to the detecting circuit after the detecting circuit detects the predetermined carrier pulse until the subsequent symbol period starts.

Demodulating means is provided for demodulating the PPM signal based on the data of the conversion rule which is sent from the modulating circuit together with the PPM signal.

It is preferable that the setting means sets such a conversion rule that each of the divisions of the input data signal which have common identical data appearing more frequently is converted into the PPM signal in which the carrier pulse is provided earlier within the symbol period.

In each of the above-described first and second modulating circuits according to the present invention, the controlling means stops supply of the clock signal to the detecting circuit after the detecting circuit detects the predetermined carrier pulse until the subsequent symbol period starts. As a result, it is possible to effectively reduce a consumption of an electric current.

In each of the first modulating circuit and the modulating circuit of the modulating and demodulating circuit system according to the present invention, the counting means divides a predetermined amount of the input data signal into divisions, each division having a predetermined number of bits, and counts an appearance frequency of the divisions of the input data signal for each identical data. The setting means sets, in accordance with the appearance frequency of the divisions of the input data signal counted for each identical data by the counting means, a conversion rule in accordance with which the divisions of the input data signal are converted into the PPM signal for each identical data. It is preferable that the setting means sets such a conversion rule that each of the divisions of the input data signal which have common identical data appearing more frequently is converted into the PPM signal in which the carrier pulse is provided earlier within the symbol period. As a result, the period during which the inputting of the clock signal is stopped can be maximized in the second demodulating circuit and the demodulating circuit of the modulating and demodulating circuit system. Thereby, power consumption there is further effectively reduced.

Other object is and further features of the present invention will become more apparent from the following detailed description when read in conjunction with the accompanying drawings.

DETAILED DESCRIPTIONS OF THE PREFERRED EMBODIMENT

In each of a: demodulating circuit, and a demodulating circuit of a modulating and demodulating circuit system, according to the present invention, when the PPM signal is demodulated, inputting of the clock signal to circuit devices such as a flip-flop and so forth used for determining the carrier pulse is stopped, after the carrier pulse, that is, the timing of the chip at which the pulse of "H" is provided during the symbol period, is detected, until the subsequent symbol period starts. Thereby, power consumption is effectively reduced.

In each of a modulating circuit, and a modulating circuit of the modulating and demodulating circuit system according to the present invention, a conversion rule used for modulation in the PPM method is variable. Specifically, the conversion rule is determined so that the thus-obtained PPM signal has the carrier pulse provided earlier during each of many symbol periods. Thereby, the period during which the inputting of the clock signal is stopped can be maximized in each of the demodulating circuit, and the demodulating circuit of the modulating and demodulating circuit system, according to the present invention. Thereby, power consumption is further effectively reduced.

A demodulating circuit, and a modulating and demodulating circuit system, in embodiments of the present invention, having the above-described features, will now be described.

After the descriptions of the above-mentioned embodiments, a case where the demodulating circuit, or the modulating and demodulating circuit system, according to the present invention, is applied to an infrared data communication system using the method of the IrDA1.1, 4 Mbps will be described.

A demodulating circuit using the PPM method in a first embodiment of the present invention will now be described.

FIG. 1 shows the PPM signal obtained as a result of modulating a data signal in the PPM method. As described above, in the 4-value PPM method, a data signal is divided so that 2 bits are one unit. Then, each 2 bits of the data signal are converted into the PPM signal as a result of a pulse being provided at a chip specified in accordance with the value of the 2 bits of the data signal. For the purpose of convenience, the 4 chips in one symbol period are represented as chip 1, chip 2, chip 3 and chip 4 in chronological order. In accordance with a predetermined conversion rule, the 2-bit data signal "00" is converted into the PPM signal "1000" wherein a pulse is provided at the chip 1. The 2-bit data signal "10" is converted into the PPM signal "0100" wherein the pulse is provided at the chip 2. The 2-bit data signal "01" is converted into the PPM signal "0010" wherein the pulse is provided at the chip 3. The 2-bit data signal "11" is converted into the PPM signal "0001" wherein the pulse is provided at the chip 4.

Figure 4:
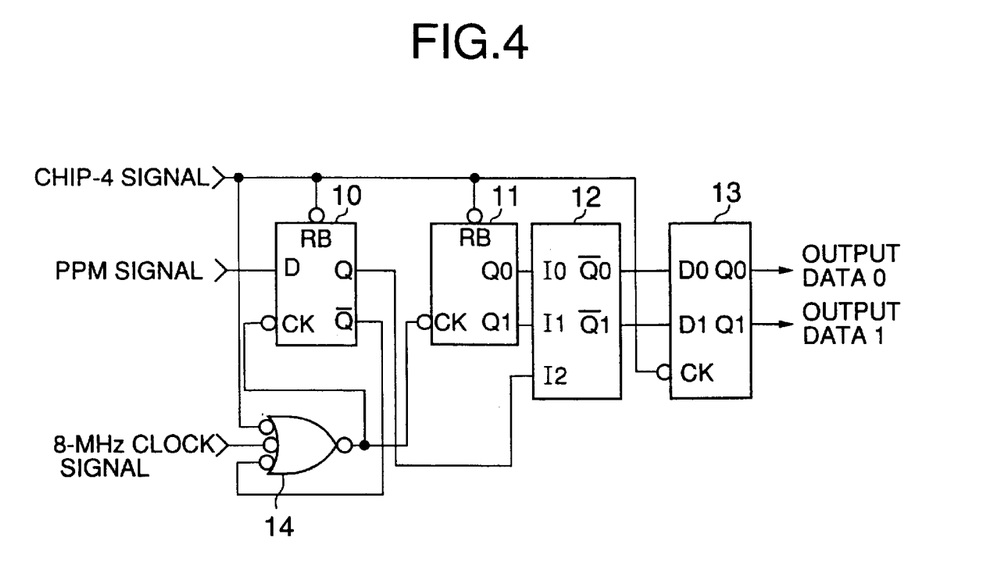
FIG. 4 shows an arrangement of a demodulating circuit in a first embodiment of the present invention

FIG. 4 shows a demodulating circuit for the PPM signal of the transmission rate of 4 Mbps. This demodulating circuit demodulates the PPM signal, obtained through the modulation in the 4-value PPM method, so as to obtain the original data signal. In this circuit, when the PPM signal is demodulated, inputting of the clock signal to circuit devices of the demodulating circuit is stopped, after the carrier pulse, that is, the timing of the chip at which the pulse of "H" is provided during the symbol period, is detected.

As described above, in the PPM signal obtained as a result of the modulation in the 4-value PPM method, the pulse of "H" is provided at only one chip of the four chips of one symbol period. The chip at which the pulse of "H" (carrier pulse) is provided is detected by using a clock signal having a frequency double or higher than double the transmission rate. Although a clock signal of the frequency four times or higher than four times the transmission rate is used ordinarily, the clock signal of 8 MHz, which is double the transmission rate, is used in this circuit for determining levels of the PPM signal. A chip-4 signal is a signal, a level of which is "L" at the chip 4 of the PPM signal.

This circuit includes a flip-flop 10, a counter 11, a decoder 12, a register 13 and a 3-input AND gate 14. The PPM signal is input to the data input terminal D of the flip-flop 10. The signal output from the AND gate 14 is inverted and input to the clock signal input terminal CK of the flip-flop 10.

A case where the level of the PPM signal input to the data input terminal D of the flip-flop 10 is "L" during the period of the chip 1 through the chip 3 will now be described. In this case, the chip-4 signal of "H", the clock signal of the frequency of 8 MHz and the signal of "H" output from the output terminal $\overline{Q}$ are input to the 3-input AND gate 14. In response to the thus-input signals, the 3-input AND gate 14 outputs the clock signal of the frequency of 8 MHz to the clock signal input terminal CK of the flip-flop 10.

A case where the level of the PPM signal input to the data input terminal D of the flip-flop 10 is "H" at any one of the chip 1 through the chip 3, that is, the carrier pulse is input during the period of the chip 1 through chip 3, will now be described. In this case, when the carrier pulse is input, the chip-4 signal of "H", the clock signal of the frequency of 8 MHz and the signal of "L" output from the output terminal $\overline{Q}$ are input to the 3-input AND gate 14. In response to the thus-input signals, the 3-input AND gate, 14 outputs the signal of the value "0" always regardless of the values of the clock signal. Thus, the supply of the clock signal to the clock signal input terminal CK of the flip-flop 10 is stopped when the carrier pulse is input.

Thus, when the carrier pulse of "H" is input at any one of the chip 1 through the chip 3, and is detected, inputting of the clock signal to the clock signal input terminal CK of the flip-flop 10 is stopped until the subsequent symbol period starts. Thereby, the amount of electric current to be consumed can be effectively reduced. This power saving effect is improved as the frequency of the clock signal to be used for determining a timing of a chip at which the carrier pulse is provided is increased, from 8 MHz to 16 MHz, 32 MHz, . . .

A case where the carrier pulse is provided at the timing of the chip 4 will be described later with reference to a time chart shown in FIG. 5.

Figure 5:
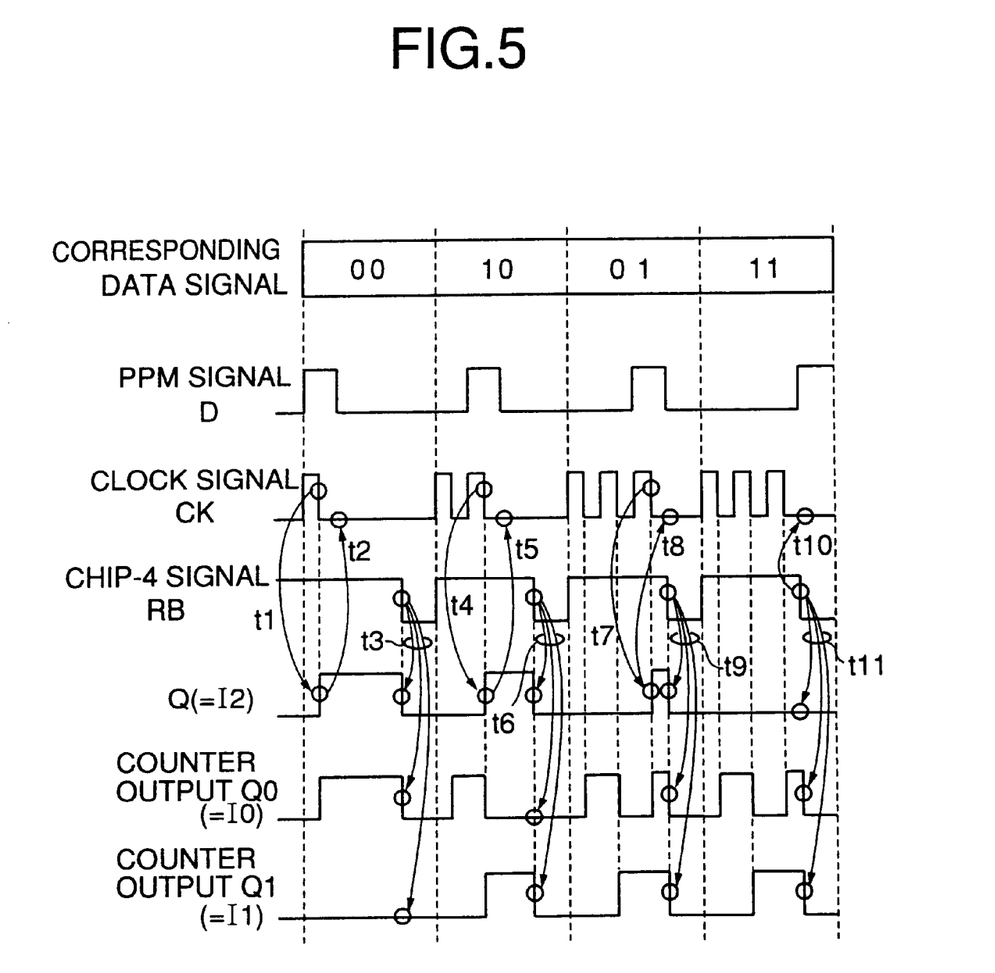
FIG. 5 is a time chart showing the states of respective signals in the demodulating circuit shown in FIG. 4.

FIG. 5 is a time chart showing the states of the respective input and output terminals in the demodulating circuit shown in FIG. 4. With reference to this time chart, changes in levels of the signals when the PPM signal obtained as a result of the modulation of the 4-value PPM method is demodulated will now be described.

When the PPM signal having the carrier pulse provided at the chip 1 is demodulated, the level of the output at the output terminal Q of the flip-flop 10 rises to "H" in response to the decay of the level of the clock signal (at a timing t1). As described above, in response to this rise to "H" of the level of the output at the output terminal Q of the flip-flop 10, the supply of the clock signal to the flip-flop 10 and to the counter 11 is stopped (at a timing t2). Then, in response to the decay to "L" of the level of the chip-4 signal, reset of the flip-flop 10 and the counter 11 is performed (at a timing t3). At this time, the values input to inputting terminals I0, I1 and I2 of the decoder 12 are as follows:

(I0, I1, I2)=(1, 0, 1)

In response thereto, the decoder 12 outputs data obtained as a result of the conversion based on the predetermined conversion rule.

When the PPM signal having the carrier pulse provided at the chip 2 is demodulated, the level of the output at the output terminal Q of the flip-flop 10 rises to "H" in response to the decay of the level of the clock signal at the second cycle thereof (at a timing t4). As described above, in response to this rise to "H" of the level of the output at the output terminal Q of the flip-flop 10, the supply of the clock signal to the flip-flop 10 and to the counter 11 is stopped (at a timing t5). Then, in response to the decay to "L" of the level of the chip-4 signal, reset of the flip-flop 10 and the counter 11 is performed (at a timing t6). At this time, the values input to the inputting terminals I0, I1 and I2 of the decoder 12 are as follows:

(I0, I1, I2)=(0, 1, 1)

In response thereto, the decoder 12 outputs data obtained as a result of the conversion based on the predetermined conversion rule.

When the PPM signal having the carrier pulse provided at the chip 3 is demodulated, the level of the output at the output terminal Q of the flip-flop 10 rises to "H" in response to the decay of the level of the clock signal at the third cycle thereof (at a timing t7). As described above, in response to this rise to "H" of the level of the output at the output terminal Q of the flip-flop 10, the supply of the clock signal to the flip-flop 10 and to the counter 11 is stopped (at a timing t8). Then, in response to the decay to "L" of the level of the chip-4 signal, reset of the flip-flop 10 and the counter 11 is performed (at a timing t9). At this time, the values input to the inputting terminals I0, I1 and I2 of the decoder 12 are as follows:

(I0, I1, I2)=(1, 1, 1)

In response thereto, the decoder 12 outputs data obtained as a result of the conversion based on the predetermined conversion rule.

When the PPM signal having the carrier pulse provided at the chip 4 is demodulated, this carrier pulse is detected at the time of the decay of the level of the clock signal at the fourth cycle thereof. However, at this time, because the chip-4 signal decays to "L", the level of the output at the output terminal Q of the flip-flop 10 does not rise to "H" but remains at "L". In this case, although the level of the output at the output terminal Q of the flip-flop 10 input to the 3-input AND gate 14 remains at "H", because the level of the chip-4 signal changes from "H" to "L", the supply of clock signal to the flip-flop 10 and to the counter 11 is stopped (at a timing t10). Further, in response to the decay to "L" of the level of the chip-4 signal, reset of the flip-flop 10 and the counter 11 is performed (at a timing t11). At this time, the values input to the inputting terminals I0, I1 and I2 of the decoder 12 are as follows:

(I0, I1, I2)=(1, 1, 0)

In response thereto, the decoder 12 outputs data obtained as a result of the conversion based on the predetermined conversion rule.

The conversion rule used in the decoder 12 in this circuit is set as follows:

the data "00" is output in response to the input of the signal (I0, I1, I2)=(1, 0, 1);

the data "10" is output in response to the input of the signal (I0, I1, I2)=(0, 1, 1);

the data "01" is output in response to the input of the signal (I0, I1, I2)=(1, 1, 1); and the data "11" is output in response to the input of the signal (I0, I1, I2)=(1, 1, 0).

The signal obtained as a result of inverting the chip-4 signal is input to the clock signal input terminal CK of the register 13. In response to the decay of the chip-4 signal, the register 13 stores the data obtained as a result of the conversion by the decoder 12. In response to the subsequent decay of the chip-4 signal, the register 13 outputs the data obtained as a result of the conversion by the decoder 12.

Thus, in the PPM demodulating circuit in the first embodiment of the present invention, when the PPM signal is demodulated, inputting of the clock signal to the flip-flop 10 and to the counter 11 is stopped, the clock signal being used for determining levels of the PPM signal, after the timing of the chip at which the level of the PPM signal is "H" is detected, within the symbol period. Thereby, the amount of electric current to be consumed can be effectively reduced.

A modulating and demodulating circuit system including a PPM modulating circuit and a PPM demodulating circuit in a second embodiment of the present invention will now be described.

In the modulating circuit used in the system in the second embodiment, the conversion rule of data is not fixed, but the carrier pulse is allocated to an earlier chip for the data which appears more frequently. Specifically, first, a predetermined amount of data to be transferred is input, the numbers of appearances of the 2-bit data "00", "10", "01" and "11" are counted, respectively, and the order of the 2-bit data is determined from the 2-bit data appearing most frequently, the order being order of the appearance frequency. Then, the data "1000", "0100", "0010" and "0001" is allocated for the 2-bit data from the most frequently appearing 2-bit data in the thus-determined order. Thus, the conversion rule is set. After the setting of the conversion rule, the same data to be transferred is input again, and the conversion in accordance with the thus-set conversion rule is performed on the input data. The modulating circuit outputs the data of the thus-set conversion rule before outputting the PPM signal itself.

The demodulating circuit, first, sets the data of the conversion rule output from the modulating circuit in the decoder, and then, demodulates the PPM data so as to obtain the original data. At the time of the demodulation, inputting of the clock signal, which is used for determining levels of the PPM signal, to circuit devices of the demodulating circuit is stopped after the timing of the chip at which the PPM signal has the level "H" is detected, during the symbol period. Thereby, the amount of electric current to be consumed can be effectively reduced.

Thus, in this system, when the modulation of the PPM method is performed by the modulating circuit, the timing of the chips at which the carrier pulses are provided are concentrated to earlier timings in the symbol periods, respectively. Thereby, it is possible to maximize the period during which inputting of the clock signal to the circuit devices in the demodulating circuit is stopped. As a result, the amount of electric current to be consumed can be further effectively reduced.

Figure 6:
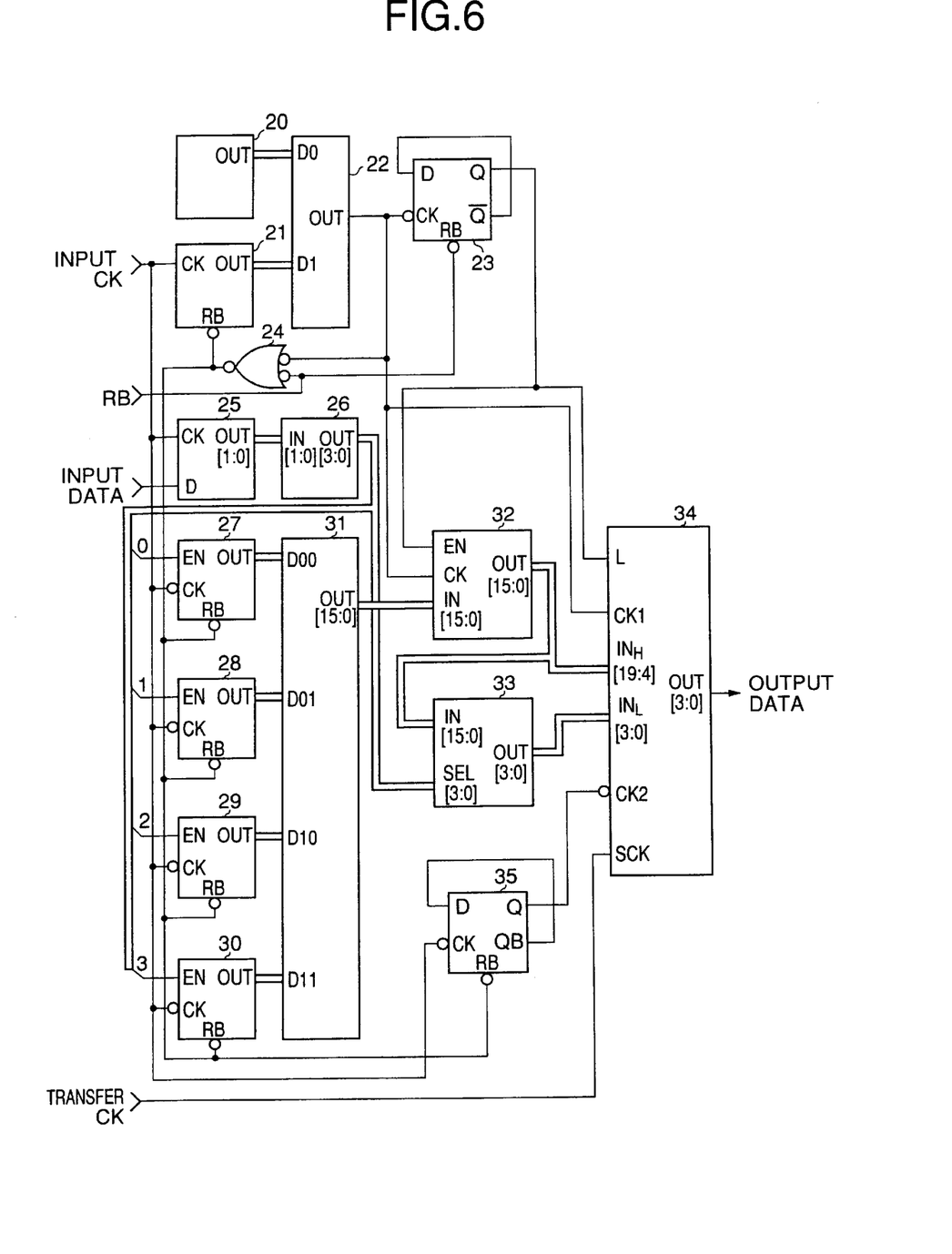
FIG. 6 shows an arrangement of a modulating circuit of a modulating and demodulating circuit system in a second embodiment of the present invention.

FIG. 6 shows the modulating circuit in the modulating and demodulating circuit system.

The number of bits, used as a unit for which each processing is performed, is set to be 500 bits, 1 kilobits or the like in a register 20. A counter 21 performs counting of pulses of an input clock signal which determines the transmission rate of the PPM signal. A comparator 22 compares the count value of the counter 21 with the set value of the register 20, and outputs a signal, the level of which is "L", when the count value of the counter 21 agrees with the set value of the register 20. This output of the comparator 22 is input to the clock signal input terminal CK of a subsequent flip-flop 23, an AND gate 24, and the clock signal input terminal CK of a data register 32. The flip-flop 23 outputs a signal which has the level "H" when the number of times the level of the signal output from the comparator 22 is "L", that is, the number of times the count value of the counter 21 agrees with the set value of the register 20, is an odd number. The level of the signal output from the flip-flop 23 is "L" when the number of times the level of the signal output from the comparator 22 is "L", that is, the number of times the count value of the counter 21 agrees with the set value of the register 20, is an even number. This output of the flip-flop 23 is input to the enable terminal EN of the data register 321, and also, is input to the latch signal input terminal L of a shift register 34.

The data signal is input to a shift register 25 first. The data signal input to the shift register 25 is such that a predetermined number of bits of data is input first, and then, the predetermined number of bits of the same data is input again. This predetermined number is the same as the number set in the register 20. As a result, during a period during which the predetermined number of bits of the data is input first, the level of the output of the flip-flop 23 is "L". Then, when the first inputting of the predetermined bits of the data is finished, the level of the output of the flip-flop 23 becomes "H". Then, during a period during which the predetermined number of bits of the same data is input second, the level of the output of the flip-flop 23 remains at "H" until the second inputting of the predetermined bits of the same data is finished.

In the shift register 25, the input data signal is divided for each 2 bits, and then, the thus-obtained 2-bit data is output to a subsequent encoder 26. In the encoder 26, the 2-bit data input sequentially is converted into 4-bit data in accordance with the contents of the input 2-bit data, and then, the thus obtained 4-bit data is output to counters 27, 28, 29 and 30. Specifically, the 4-bit data "1000" is output in response to the 2-bit data "00" being input; the 4-bit data "0100" is output in response to the 2-bit data "10" being input; the 4-bit data "0010" is output in response to the 2-bit data "01" being input; land the 4-bit data "0001" is output in response to the 2-bit data "11" being input.

The first bit of data of the 4-bit data output from the encoder 26 is input to the counter 27; the second bit of data of the 4-bit data output from the encoder 26 is input to the counter 28; the third bit of data of the 4-bit data output from the encoder 26 is input to the counter 29; and the fourth bit of data of the 4-bit data output from the encoder 26 is input to the counter 30. The count value of each of the counters 27, 28, 29 and 30 is incremented in response to the level "H" of the signal being input. The comparator 31 compares the count values of the counters 27, 28, 29 and 30, and allocates the PPM signal "1000", "0100", "0010" and "0001" for the 2-bit data in order of the count values of the counters 27, 28, 29 and 30. The comparator 31 outputs the PPM signal allocated for the 2-bit data in an order of the 2-bit data "00", "10", "01" and "11" as serial data. For example, it is assumed that, as a result of the counting by the counters 27, 28, 29 and 30, the appearance frequencies are higher in an order of "11", "00", "10" and "01". (That is, the appearance frequency of the 2-bit data "11" is highest, the appearance frequency of the 2-bit data "00" is second highest, the appearance frequency of the 2-bit data "10" is third highest, and the appearance frequency of the 2-bit data "01" is lowest.) In this case, "1000" is allocated for "11", "0100" is allocated for "00", "0010" is allocated for "10", and "0001" is allocated for "01". In this case the comparator 31 outputs 16-bit serial data "0100 0010 0001 1000".

The 16-bit data output from the comparator 31 is input to the data register 32. In the data register 32, in a case where the level of the signal output from the flip-flop 23 is "H", that is, the number of times of inputting of the signal of the level of "L" from the comparator 22 is an odd number (that is, during a period during which the predetermined number of bits of data is input second), the data output from the comparator 31 is latched when the output of the comparator 22 rises from "L" to "H", and is output to a selector 33 and the shift register 34.

Based on the 4-bit data output from the encoder 26, the selector 33 selects predetermined 4-bit data from the 16-bit data output from the data register 32. Specifically, in a case where the 4-bit data "1000" is output from the encoder 26, the selector 32 selects the most significant 4 bits "0100" (4-bit data) from the 16-bit data "0100 0010 0001 1000" as the PPM signal to be allocated for the data signal "00", and, outputs the thus-selected 4-bit data. In a case where the 4-bit data "0100" is output from the encoder 26, the selector 32 selects the second most significant 4 bits "0010" (4-bit data) from the 16-bit data "0100 0010 0001 1000" as the PPM signal to be allocated for the data signal "10", and outputs the thus-selected 4-bit data. In a case where the 4-bit data "0010" is output from the encoder 26, the selector 32 selects the third most significant 4 bits "0001" (4-bit data) from the 16-bit data "0100 0010 0001 1000" as the PPM signal to be allocated for the data signal "01",and outputs the thus-selected 4-bit data. In a case where the 4-bit data "0001" is output from the encoder 26, the selector 32 selects the least significant 4 bits "1000" (4-bit data) from the 16-bit data "0100 0010 0001 1000" as the PPM signal to be allocated for the data signal "11", and outputs the thus-selected 4-bit data.

The shift register 34 can latch 20 bits of data, and can read data only when the level of the output of the flip-flop 23 is "H" (that is, during a period during which the predetermined number of bits of data is input second). As the most significant 16 bits of data [19:4] (that is, from the bit of the number 19 through the bit of the number 4), the 16-bit data output from the data register 32 is taken by the shift register 34 in response to the rise from "L" to "H" of the level of the signal output from the comparator 22. As the least significant 4 bits of data [3:0] (that is, from the bit of the number 3 through the bit of the number 0), the 4-bit data output from the selector 33 is taken by the shift register 34, in response to the rise of the level of the signal output from a flip-flop 35, which is a frequency-divided-by-two circuit of the input clock signal. Shift of the data in the shift register 34 is performed based on a transfer clock signal. The transfer signal is controlled so that a shift of 4 bits is performed each time when the least significant 4 bits are loaded. Then, when the input data is finished, the remaining 16 bits are shifted. In response to the inputting of the transfer clock signal, the data output from the shift register 34 is output from this modulating circuit as the PPM signal. That is, as the output signal, the data which indicates the conversion rule, in accordance with which the PPM signal has been allocated for each data signal, that is, the 16 bits of data "0100 0010 0001 1000", is output first, and then, the PPM signal is output.

In this modulating circuit, during a period during which the predetermined number of bits of data is input first, the conversion rule is determined by using the thus-input predetermined number of bits of the data. Then, during a period during which the predetermined number of bits of the same data is input second, the 16-bit data indicating the thus-determined conversion rule is output, and then, the PPM signal obtained as a result of the conversion in accordance with this conversion rule being performed on the second-input predetermined bits of the data is output.

The signal output from the comparator 22 and an initial resetting signal RB are input to the AND circuit 24. The initial resetting signal RB has the level "H" when this modulating circuit is initialized. Thereby, reset of the counters 21, 27, 28, 29 and 30, and the flip-flop 35 is performed initially. Then, reset of the counters 21, 27, 28, 29 and 30, and the flip-flop 35 is performed each time when the level of the signal output from the comparator 22 is "L", that is, when the count value of the counter 21 agrees with the set value of the register 20.

Figure 7:
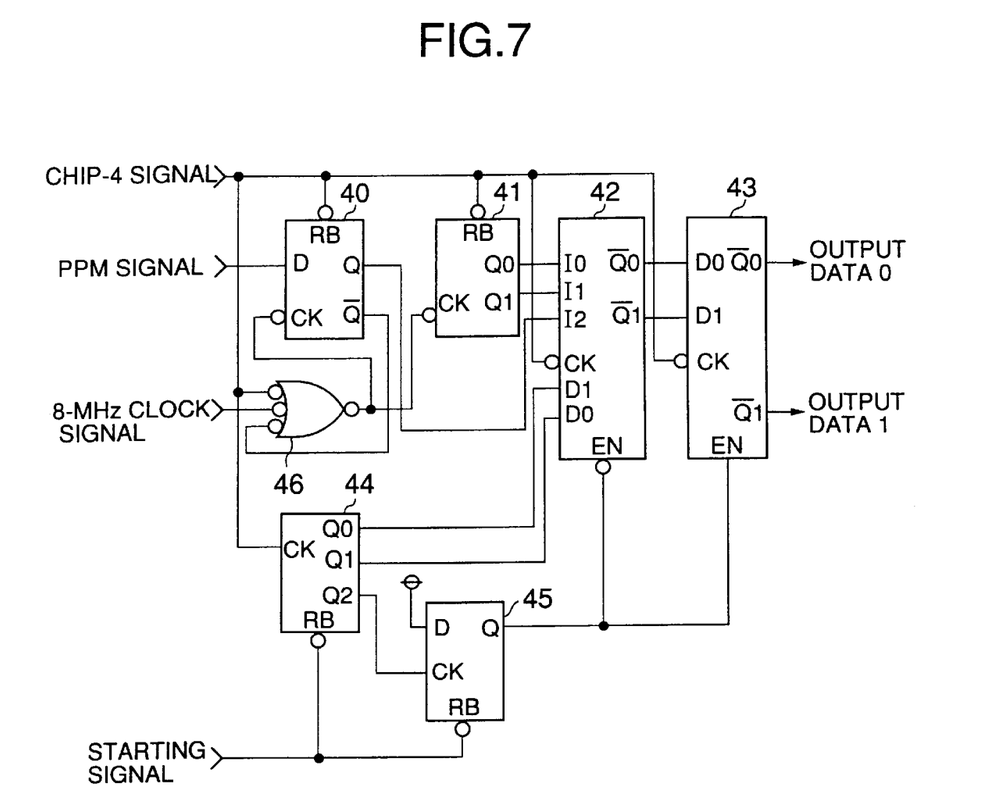
FIG. 7 shows an arrangement of a demodulating circuit of the modulating and demodulating circuit system in the second embodiment of the present invention.

FIG. 7 shows an arrangement of the demodulating circuit of this system. In the demodulating circuit, setting is performed on a decoder based on, the data of the conversion rule which is sent prior to the PPM signal from the modulating circuit. After the setting of the decoder, demodulation of the PPM signal is performed.

This circuit shown in FIG. 7 is basically the same as the circuit shown in FIG. 4 of the first embodiment. However, circuit devices are added, by which, when receiving the data output from the modulating circuit, circuit devices for demodulating a signal (specifically, registers 42 and 43) are not caused to be active for the first 16 bits of data, setting of the conversion rule is performed based on the first 16 bits of data, and demodulation is performed on the data transmitted after the first 16 bits of data.

Functions and operations of a flip-flop 40, a counter 41 and a 3-input AND gate 46 are the same as those of the flip-flop 10, counter 11 and 3-input AND gate 14 in the first embodiment. In response to a start of reception of the data, reset of a counter 44 and a flip-flop 45 is performed as a result of a signal of the level "L" being input to the reset terminals RB of these circuit devices. The counter 44 is a 3-bit counter and the count value thereof is incremented at the decaying edge of the chip-4 signal. The counter 44 outputs the first bit of data of the count value from an output terminal Q0 and the thus-output data is input to a data input terminal D1 of the register 42. The counter 44 outputs the second bit of data of the count value from an output terminal Q1 and the thus-output data is input to a data input terminal D0 of the register 42. As a result of the count value being incremented four times, the third bit of data of the count value of the counter 44 is "H". At this time, this third bit of data is input to the clock signal input terminal CK of the flip-flop 45. A signal always of the level "H" is input to the data input terminal D of the flip-flop 45. Because reset of the flip flop 45 is performed at the time of reception of the data, the level of the output Q thereof is "L". However, once the signal of the level "H" is input to the clock signal input terminal CK of the flip-flop 45, the level of the output Q thereof is "H". The output a of the flip-flop 45 is input to the enable terminals EN of the registers 42 and 43. By the operations of the counter 44 and the flip-flop 45, the resisters 42 and 43 are not caused to be active until the first 16 bits of data of the signal transmitted from the modulating circuit is input to this demodulating circuit. The register 42 writes the data input through input terminals D0 and DI at the addresses indicated by the data input through input terminals I0, I1 and I2 as the data of the conversion rule at the decaying edge of the chip-4 signal during the period during which the level of the output of the flip-flop 45 is "L".

Similar to the case of decoder 12 in the demodulating circuit in the first embodiment, in response to inputting of the PPM signal "1000", data "1", "0", "1" is input to input terminals I0, I1, I2 of the decoder 42, respectively. In response to inputting of the PPM signal "0100", data "0", "1", "1" is input to input terminals I0, I1, I2 of the decoder 42, respectively. In response to inputting of the PPM signal "0010", data "1", "1", "1" is input to input terminals I0, I1, I2 of the decoder 42, respectively. In response to inputting of the PPM signal "0001", data "1", "1", "0" is input to input terminals I0, I1, I2 of the decoder 42, respectively.

For example; in the case where the first 16 bits of data are "0100 0010 0001 1000", it is determined that such a conversion rule has been used in the above-described modulating circuit that data "0100", "0010", "0001" and "1000" is allocated for the 2-bit data "00", "10", "01", "11", respectively, in the above-described modulating circuit. In this case, in the register 42, the data "00" is written for (I2, I1, I0)=(1, 1, 0); the data "10" is written for (I2, I1, I0)=(1, 1, 1); the data "01" is written for (I2, I1, I0)=(0 1, 1); and the data "11" is written for (I2, I1, I0)=(1, 0, 1). The register 42 performs demodulation on the data starting from the 17th bit based on the conversion rule which has been written as described above based on the first 16 bits of data. Thus, in the demodulating circuit, the modulation of the PPM signal can be performed based on the conversion rule which is the same as the conversion rule which has been set in the modulating circuit.

Thus, in this system, when the modulation of the PPM method is performed by the modulating circuit, the timings of the chips at which the carrier pulses are provided are concentrated to earlier timings in the symbol periods respectively. Thereby, it is possible to maximize the period during which inputting of the clock signal to the circuit devices in the demodulating circuit is stopped. As a result, the amount of electric current to be consumed can be further effectively reduced.

A case where the demodulating circuit, or the modulating and demodulating circuit system, according to the present invention, is actually applied to an infrared data communication system according to the method of the IrDA1.1, 4 Mbps, will now be considered.

Figure 8:
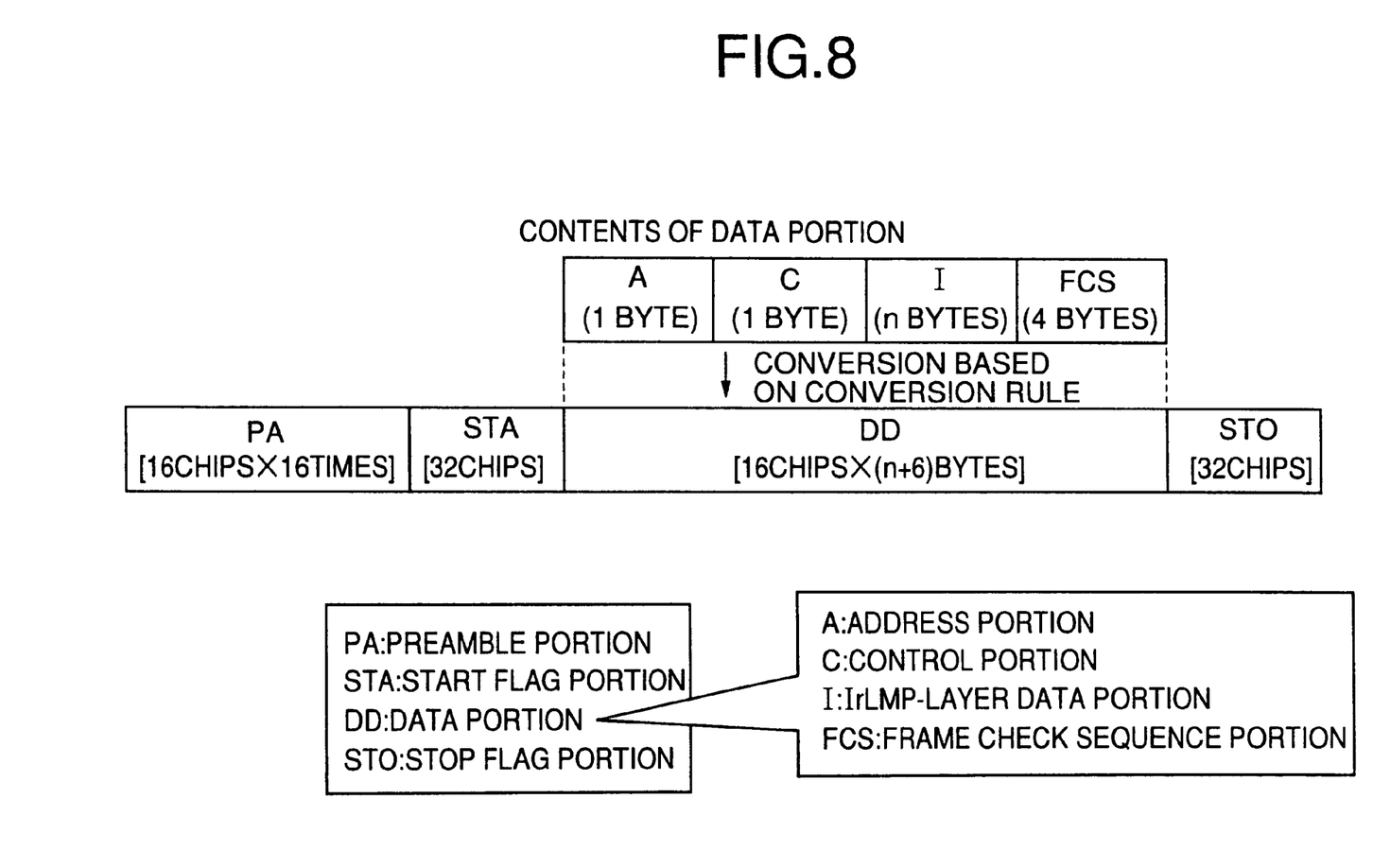
FIG. 8 shows a format of a frame of data used in the method of the IrDA1.1, 4 Mbps.

FIG. 8 shows a format of a frame of data used in the method of the IrDA1.1, 4 Mbps. In the method of the IrDA1.1, 4 Mbps, the 4-value PPM method is used.

However, in a preamble portion (PA), a start flag portion (STA) and a stop flag portion (STO), which are provided for protecting the data of a data portion (DD) to be exactly transmitted to a remote station, there are patterns each of which is not in accordance with the 4-value PPM method. For example, a pattern of consecutive 4 bits in which no pulse of "H" is included, and a pattern of consecutive 4 bits in which two pulses of "H" are included, are present. Therefore, neither the above-described demodulating circuit in the first embodiment nor the above-described modulating and demodulating circuit system in the second embodiment can be applied simply.

A circuit for detecting the data of the preamble portion (PA), start flag portion (STA) and stop flag portion (STO), which is transmitted and received, in accordance with the format thereof, in the infrared data communication system in accordance with the method of the IrDA1.1, 4 Mbps, is well-known.

Therefore, in the infrared data communication system, the demodulating circuit or the modulating and demodulating circuit system according to the present invention is applied for only the data of the data portion (DD), which is provided subsequent to the above-mentioned preamble portion (PA) and start flag portion (STA).

Figure 9A:
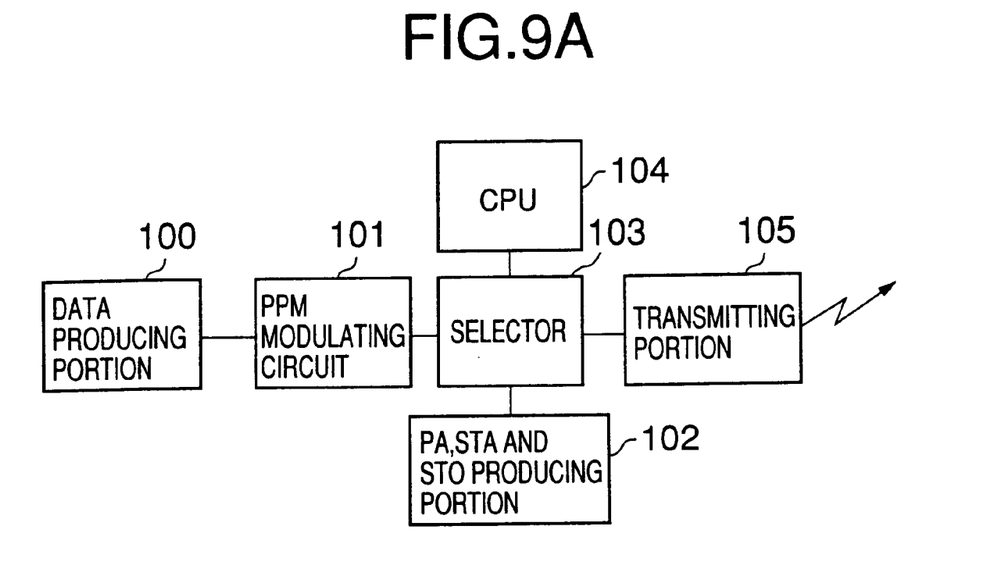
FIG. 9A shows a modulating circuit in an infrared data communication system.
Figure 9B:
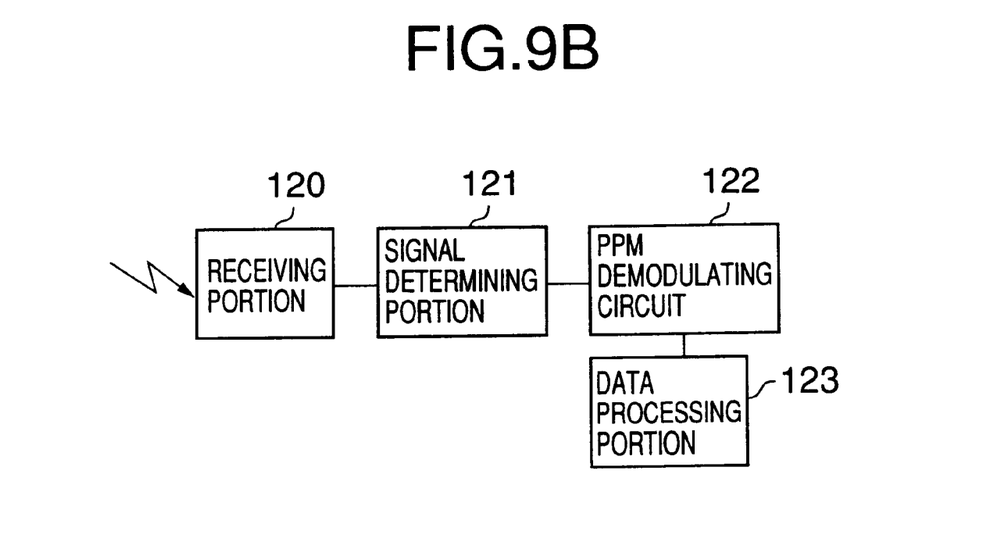
FIG. 9B shows a demodulating circuit in the infrared data communication system.

FIGS. 9A and 9B show a block diagram of the infrared data communication system to which the modulating circuit (see FIG. 4) or the modulating and demodulating circuit system (see FIGS. 6 and 7) according to the present invention is applied. FIG. 9A shows an arrangement of an infrared data transmitting apparatus and FIG. 9B shows an arrangement of an infrared data receiving apparatus.

In the transmitting apparatus in FIG. 9A, a data signal produced in a data producing portion 100 is input to a PPM modulating circuit 101, thereby modulation in accordance with the 4-value PPM method being performed on the data signal. Thus, the PPM signal is obtained. A central processing unit (CPU) 104 controls a selector 103 so that the selector 103 outputs the thus-obtained PPM signal to a transmitting portion 105 after outputting the preamble portion (PA) and start flag portion (STA) of predetermined formats, which have been produced in a PA, STA and STO producing portion 102, to the transmitting portion 105. After completion of outputting of the PPM signal to the transmitting portion 105, the selector 103 outputs the stop flag portion (STO) of a predetermined format, which has been produced in the PA, STA and STO producing portion 102, to the transmitting portion 105. The transmitting portion 105 transmits the data, input thereto through the selector 103.

In the receiving apparatus shown in FIG. 9B, a receiving portion 120 outputs received data to a signal determining portion 121. The signal determining portion 121 recognizes the data portion (DD) from the received data, and outputs the data portion to a PPM demodulating circuit 122. Data obtained as a result of demodulation performed by the PPM demodulating circuit 122 is processed in a data processing portion 123.

The demodulating circuit in the first embodiment shown in FIG. 4 may be applied to the PPM demodulating circuit 122 shown in FIG. 9B. Alternatively, the modulating circuit of the modulating and demodulating system in the second embodiment shown in FIG. 6 and the demodulating circuit of the modulating and demodulating system in the second embodiment shown in FIG. 7 may be applied to the PPM modulating circuit shown in FIG. 9A and the PPM demodulating circuit shown in FIG. 9B, respectively.

Figure 10:
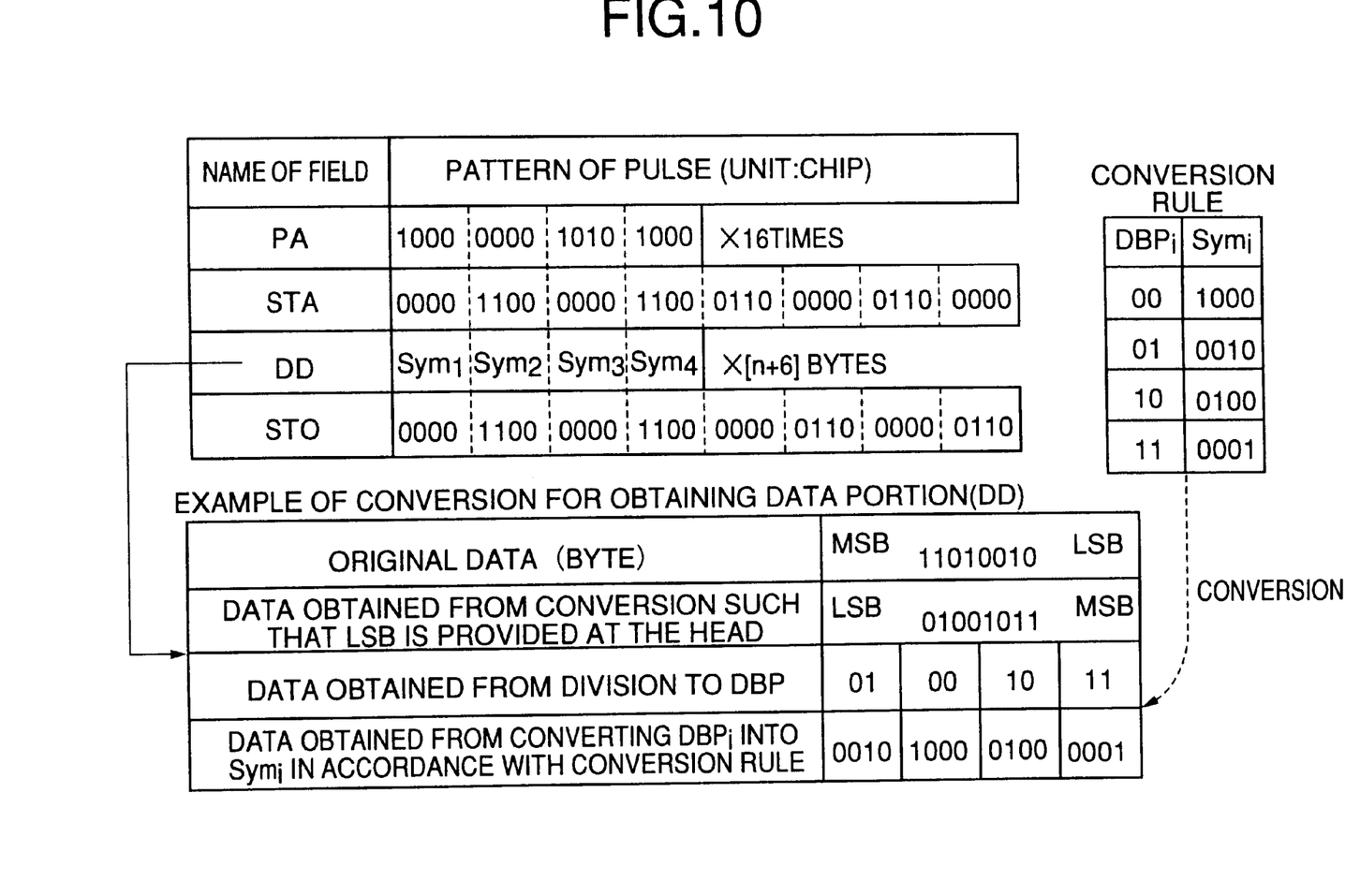
FIG. 10 shows an example of a conversion processing of a data portion (DD) performed by the modulating circuit according to the present invention when data communication which uses the method of the IrDA1.1, 4 Mbps, is performed.

FIG. 10 shows an example of modulation processing performed in the PPM modulating circuit 101 shown in FIG. 9A. In the data producing portion 100, the bits of the original data are rearranged so that the data in which the MSB (Most Significant Bit) is arranged at the head is converted into data in which the LSB (Least Significant Bit) is arranged at the head. The thus-obtained data is output to the PPM modulating circuit 101. In the PPM modulating circuit 101, the thus-obtained data is divided into DBPi ("i" representing a data number after the data division is performed, hereinafter) for each two bits. Then, based on the conversion rule which is a predetermined one or is set as a result of predetermined data processing, each 2-bit data DBPi is converted into the PPM signal Symi which is 4-bit data.

Thus, in the infrared data communication system in accordance with the method of the IrDA1.1, 4 Mbps, as a result of the demodulating circuit or the modulating and demodulating circuit system according to the present invention being used for the data of the data portion (DD) which is provided subsequent to the preamble portion (PA) and start flag portion (STA), it is possible to effectively reduce the consumption of electric current in the demodulating circuit in the infrared data communication system.

Further, the present invention is not limited to the above-described embodiment, and variations and modifications may be made without departing from the scope of the present invention.

The contents of the basic Japanese Patent Application No.9-178095, filed on Jul. 3, 1997, are hereby incorporated by reference.

What is claimed is:

1. A modulating circuit for modulating an input data signal into a PPM signal in accordance with a PPM method, comprising:

counting means for dividing a predetermined amount of the input data signal into divisions, each division having a predetermined number of bits, and counting an appearance frequency of the divisions of the input data signal for each identical data;

setting means for setting, in accordance with the appearance frequency of the divisions of the input data signal counted for each identical data by said counting means, a conversion rule in accordance with which the divisions of the input data signal are converted into the PPM signal for each identical data;

modulating means for modulating the predetermined amount of the input data signal into the PPM signal in accordance with the conversion rule set by said setting means; and     outputting means for outputting data of the conversion rule and the PPM signal.

2. The modulating circuit, according to claim 1, wherein:

said setting means sets such a conversion rule that each of the divisions of the input data signal which have common identical data appearing more frequently is converted into the PPM signal in which a carrier pulse is provided earlier within a symbol period.

3. A modulating and demodulating circuit system, comprising:

a modulating circuit for modulating an input data signal into a PPM signal in accordance with a PPM method, comprising:

counting means for dividing a predetermined amount of the input data signal into divisions, each division having a pre determined number of bits, and counting an appearance frequency of the divisions of the input data signal for each identical data;

setting means for setting, in; accordance with the appearance frequency of the divisions of the input data signal counted for each identical data by said counting means, a conversion rule in accordance with which the divisions of the input data signal are converted into the PPM signal for each identical data;

modulating means for modulating the predetermined amount of the input data signal into the PPM signal in accordance with the conversion rule set by said setting means; and outputting means for outputting data of the conversion rule and the PPM signal; and a demodulating circuit, comprising:

a detecting circuit detecting a predetermined carrier pulse provided within a symbol period of a PPM signal, using a clock signal having a frequency double or higher than double a transmission rate of the PPM signal;

controlling means for stopping supply of the clock signal to said detecting circuit after said detecting circuit detects the predetermined carrier pulse until a subsequent symbol period starts; and demodulating means for demodulating the PPM signal based on the data of the conversion rule which is sent from said modulating circuit together with the PPM signal.

4. The modulating and demodulating circuit system, according to claim 3, wherein:

said setting means sets such a conversion rule that each of the divisions of the input data signal which have common identical data appearing more frequently is converted into the PPM signal in which the carrier pulse is provided earlier within the symbol period.

5. A modulating circuit for modulating an input data signal into a PPM signal in accordance with a PPM method, comprising:

a counting portion dividing a predetermined amount of the input data signal into divisions, each division having a predetermined number of bits, and counting an appearance frequency of the divisions of the input data signal for each identical data;

a setting portion setting, in accordance with the appearance frequency of the divisions of the input data signally counted for each identical data by said counting portion, a conversion rule in accordance with which the divisions of the input data signal are converted into the PPM signal for each identical data;

a modulating portion modulating the predetermined amount of the input data signal into the PPM signal in accordance with the conversion rule set by said setting portion; and an outputting portion outputting data of the conversion rule and the PPM signal.

6. The modulating circuit, according to claim 5, wherein:

said setting portion sets such a conversion rule that each of the divisions of the input data signal which have common identical data appearing more frequently is converted into the PPM signal in which a carrier pulse is provided earlier within a symbol period.

7. A modulating and demodulating circuit system, comprising:

a modulating circuit modulating an input data signal into a PPM signal in accordance with a PPM method, comprising:

a counting portion dividing a predetermined amount of the input data signal into divisions, each division having a predetermined number of bits, and counting an appearance frequency of the divisions of the input data signal for each identical data;

a setting portion setting, in accordance with the appearance frequency of the divisions of the input data signal counted for each identical data by said counting portion, a conversion rule in accordance with which the divisions of the input data signal are converted into the PPM signal for each identical data;

a modulating portion modulating the predetermined amount of the input data signal into the PPM signal in accordance with the conversion rule set by said setting portion; and an outputting portion outputting data of the conversion rule and the PPM signal; and a demodulating circuit, comprising:

a detecting portion detecting a predetermined carrier pulse provided within a symbol period of a PPM signal, using a clock signal having a frequency double or higher than double a transmission rate of the PPM signal;

a controlling portion stopping supply of the clock signal to said detecting portion after said detecting portion detects the predetermined carrier pulse until a subsequent symbol period starts; and a demodulating portion demodulating the PPM signal based on the data of the conversion rule which is sent from said modulating circuit together with the PPM signal.

8. The modulating and demodulating circuit system, according to claim 7, wherein:

said setting portion sets such a conversion rule that each of the divisions of the input data signal which have common identical data appearing more frequently is-converted into the PPM signal in which the carrier pulse is provided earlier within the symbol period.

9. A modulating method for, modulating an input data signal into a PPM signal in accordance with a PPM method comprising:

dividing a predetermined amount of the input data signal into divisions, each division having a predetermined number of bits, and counting an appearance frequency of the divisions of the input data signal for each identical data;

setting, in accordance with the appearance frequency of the divisions of the input data signal counted for each identical data, al conversion rule in accordance with which the divisions of the input data signal are converted into the PPM signal for each identical data;

modulating the predetermined amount of the input data signal into the PPM signal in accordance with the conversion rule set; and outputting data of the conversion rule and the PPM signal.

10. A modulating and demodulating method, comprising:

modulating an input data signal into a PPM signal in accordance with a PPM method, the modulating method comprising:

dividing a predetermined amount of the input data signal into divisions, each division having a predetermined number of bits, and counting an appearance frequency of the divisions of the input data signal for each identical data;

setting, in accordance with the appearance frequency of the divisions of the input data signal counted for each identical data, a conversion rule in accordance with which the divisions of the input data signal are converted into the PPM signal for each identical data;

modulating the predetermined amount of the input data signal into the PPM signal in accordance with the conversion rule set; and outputting data of the conversion rule and the PPM signal; and a demodulating method, comprising:

detecting a predetermined carrier pulse provided within a symbol period of a PPM signal, using a clock signal having a frequency double or higher than double a transmission rate of the PPM signal;

stopping supply of the clock signal to said detecting circuit after said detecting detects the predetermined carrier pulse until a subsequent symbol period starts; and     demodulating the PPM signal based on the data of the conversion rule which is sent with the PPM signal.

\* \* \* \* \*